United States Patent
Pasternak

(10) Patent No.: US 9,231,819 B2
(45) Date of Patent: Jan. 5, 2016

(54) ABSTRACTING RESTFUL WEB SERVICE HTTP BETWEEN A CLIENT AND A SERVER

(71) Applicant: Red Hat Israel, Ltd., Raanana (IL)

(72) Inventor: Michael Pasternak, Raanana (IL)

(73) Assignee: Red Hat Israel, Ltd., Raanana (IL)

( * ) Notice: Subject to any disclaimer, the term of this patent is extended or adjusted under 35 U.S.C. 154(b) by 224 days.

(21) Appl. No.: 13/690,503

(22) Filed: Nov. 30, 2012

(65) Prior Publication Data

US 2014/0156828 A1 Jun. 5, 2014

(51) Int. Cl.
*H04L 29/08* (2006.01)
*G06F 9/44* (2006.01)
*G06F 15/173* (2006.01)

(52) U.S. Cl.
CPC ............ *H04L 29/08099* (2013.01); *G06F 8/36* (2013.01); *G06F 15/173* (2013.01); *H04L 67/02* (2013.01)

(58) Field of Classification Search
CPC ................................................. H04L 29/08099
USPC ......................................................... 709/224
See application file for complete search history.

(56) References Cited

U.S. PATENT DOCUMENTS

| | | | |
|---|---|---|---|
| 5,875,331 A * | 2/1999 | Lindsey | 717/108 |
| 6,560,633 B1 * | 5/2003 | Roberts et al. | 709/202 |
| 8,375,185 B1 * | 2/2013 | Hanson et al. | 711/163 |
| 2006/0173892 A1 * | 8/2006 | Beck | 707/102 |
| 2009/0193393 A1 * | 7/2009 | Baldwin et al. | 717/115 |
| 2010/0002254 A1 * | 1/2010 | Hyo | 358/1.15 |
| 2010/0077461 A1 * | 3/2010 | Nguyen et al. | 726/5 |
| 2010/0179825 A1 * | 7/2010 | Hanov et al. | 705/2 |
| 2014/0033170 A1 * | 1/2014 | Nimashakavi et al. | 717/120 |
| 2014/0059226 A1 * | 2/2014 | Messerli et al. | 709/226 |
| 2015/0101057 A1 * | 4/2015 | Fingold et al. | 726/25 |

* cited by examiner

*Primary Examiner* — Thomas Lee
*Assistant Examiner* — Volvick Derose
(74) *Attorney, Agent, or Firm* — Lowenstein Sandler LLP

(57) ABSTRACT

A computer system identifies metadata components that are associated with uniform resource identifiers (URIs) in service description language metadata for a RESTful (Representational State Transfer) web service The computer system identifies a programming language for a template pertaining to a method of a software development kit (SDK) client. The computer system creates the template. The template includes programming code placeholders for the metadata components based on the identified programming language.

17 Claims, 12 Drawing Sheets

FIG. 10

```
def add(self, datacenter, expect=None, correlation_id=None):
    """
    @type DataCenter:

@param datacenter.name: string
    @param datacenter.storage_type: string
    @param datacenter.version.major: int
    @param datacenter.version.minor: int
    @param datacenter.description: string
    @param datacenter.storage_format: string
    @param expect: 201-created
    @param correlation_id: any string @return DataCenter:
    """
    url = '/api/datacenters'
    result = self._getProxy().add(url=url,
        body=ParseHelper.toxml(datacenter),
        headers={"expect":expect, "correlation-id":correlation_id})
    return DataCenter(result)
```

ABSTRACTING RESTFUL WEB SERVICE HTTP BETWEEN A CLIENT AND A SERVER

TECHNICAL FIELD

The present disclosure relates to RESTful web service, and more particularly, to abstracting RESTful web service HTTP (hypertext transfer protocol) between a client and a server.

BACKGROUND

Web services are server applications that communicate over the World Wide Web's (WWW) Hypertext Transfer Protocol (HTTP). A web service is a software component provided through a network-accessible endpoint and can be called from other applications. For example, a financial company may have a web service that provides up to the minute stock quotes for customers who do their trading with that financial company. The information provided by the web service can be read from a web page and displayed, or read from a stand-alone application on a customer's desktop computer.

REpresentational State Transfer (REST) is a style of software architecture for distributed systems such as the World Wide Web. REST-style architectures include clients and servers. Clients can initiate requests to the servers, which can process the requests and return appropriate responses. In REST, requests and responses are built around the transfer of representations of resources. A representation of a resource is typically a document that captures the current or intended state of the resource. For example, the resource may be stock quotes.

A RESTful web service is a web service that is implemented using HTTP and the principals of REST. For example, a RESTful web service may be a customer data management web service and may have three resources: (1) a resource that is a list of all customers, (2) a resource that is data for a specific customer, and (3) a resource for adding a customer to the customer data. The RESTful resources can each have a uniform resource identifier (URI), which client applications can use to consume the resource.

A software developer may wish to build a client application to consume the resources provided by a RESTful web service. Typically, the software developer has to have the documentation for the RESTful web service and the documentation for the server hosting the RESTful web service. The software developer usually has to manually sort through the documentation to obtain the appropriate information for creating code for the client application.

A software developer may be familiar with a particular programming language, for example, Python or Java, but may not be familiar with HTTP, which the RESTful web service is based on. In some conventional solutions, a software developer can use a software development kit (SDK) that specializes in a particular language (e.g., Python, Java) to create a RESTful web service client. A software development kit is typically a set of software development tools that allows for the creation of applications for a certain software framework. The SDK is typically provided by the RESTful web service provider. The creation and updating of SDKs can be a time consuming process. In conventional solutions, when there is a change made to a RESTful web service, each of the SDKs are manually re-coded to reflect any changes made to the RESTful web service. Some changes in the RESTful web service may not be immediately detected and an SDK may inadvertently not be updated which can lead to problems in client communication with the RESTful web service.

BRIEF DESCRIPTION OF THE DRAWINGS

The present disclosure will be understood more fully from the detailed description given below and from the accompanying drawings of various implementations of the disclosure.

FIG. 10 illustrates an example of a portion of a template containing programming code placeholders that are populated with input data to create a method for a URI, in accordance with various implementations.

DETAILED DESCRIPTION

Figure 1:
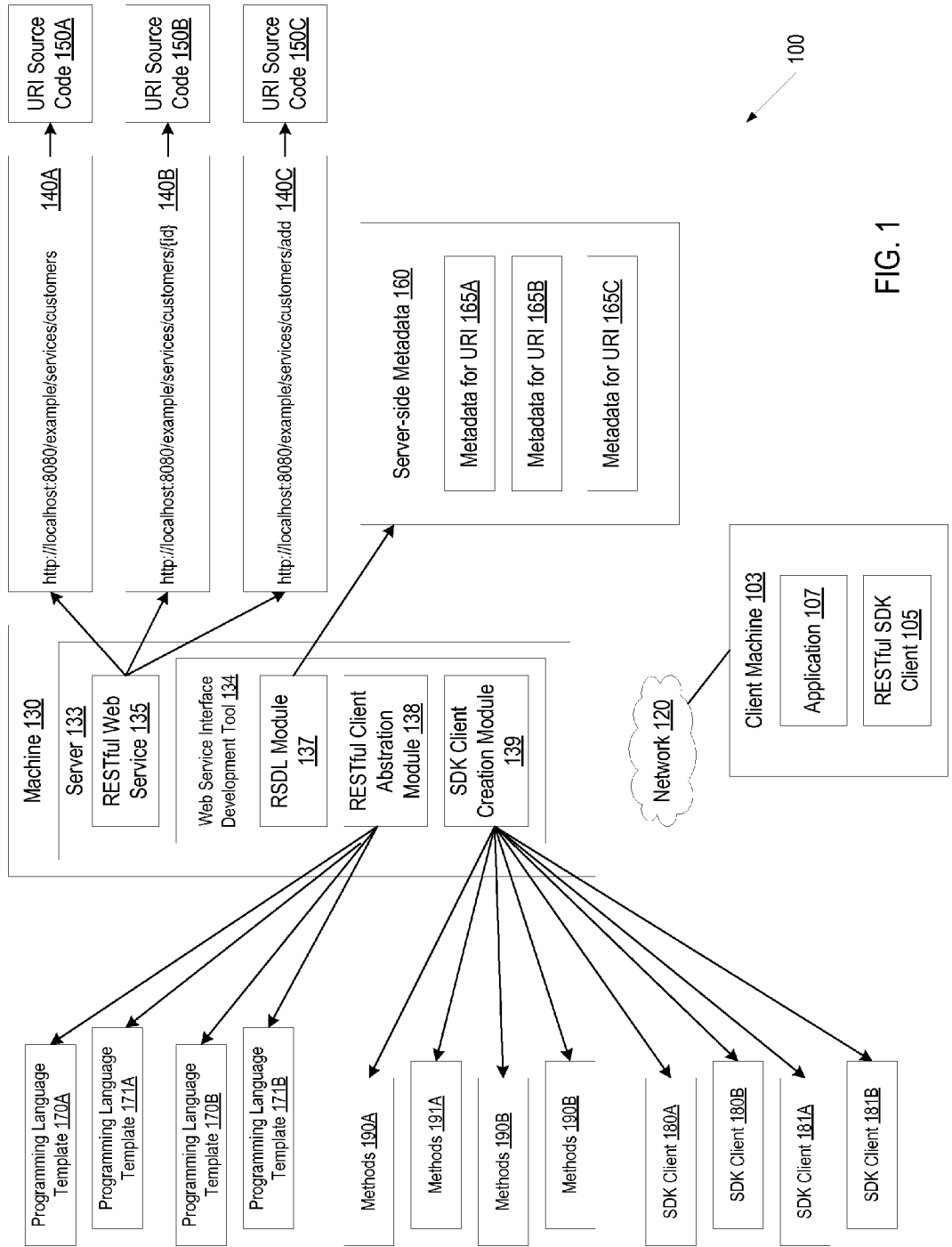
FIG. 1 illustrates an example system architecture, in accordance with various implementations.

Described herein are a method and apparatus for abstracting RESTful web service HTTP (hypertext transfer protocol) between a client and a server, according to various implementations. Implementations generate methods according to RESTful service description language (RSDL) metadata using a generic abstraction format (e.g., templates) to hide HTTP-based programming language and to expose the HTTP-based programming language as verbs formatted in the destination programming language. A RESTful web service is a web service that is implemented using HTTP (hypertext transfer protocol), or similar protocol (e.g., HTTPS), and the principals of REST. A RESTful web service may include a URI for each resource. For example, there may be a virtual infrastructure management RESTful web service for managing virtual machines. The RESTful web service may have resources to get data for a particular virtual machine (VM) identifier (ID), delete a particular VM identifier, get the status of a particular VM identifier, etc. For example, the URI "http://localhost:8080/example/services/api/vms/12345" may be for getting the data for the virtual machine identifier 12345.

Implementations provide a web service interface development tool that automatically creates an interface with a RESTful web service. As described in greater detail below in conjunction with FIG. 1, the web service interface development tool can include a RESTful service description language (RSDL) module, a RESTful client abstraction module, and a software development kit (SDK) client creation module, according to some implementations. Note that in alternative implementations, the functionality of one or more of the modules may be combined or divided. A SDK client is a tool to allow applications to consume resources of RESTful web services. A SDK client can provide user interfaces (e.g., graphical user interfaces, command-line interfaces, etc.), which users (e.g., software developers), may user to generate code, review code, etc. to allow applications to interface with a RESTful web service.

An application can consume a RESTful web service resource. For example, an application may use the RESTful web service to get information for a virtual machine. The RESTful web service is HTTP-based and a user, such as a software developer, may not have familiarity with HTTP. The software development kit (SDK) client is a development tool that enables an application to communicate with the RESTful web service via the RESTful SDK client. The SDK clients can be provided by the RESTful web service provider. The SDK clients can be provided for any number of programming languages (e.g., Python, Java, etc.). A software developer user, for example, can select a SDK client in a programming language that corresponds to the application. For example, if the application is a Python-based application, a Python SDK client for the RESTful web service can receive user input, for example, from a software developer, to configure the Python-based application to communicate with the RESTful web service.

Implementations can create templates that can be used to create methods, which correspond to the URIs of a RESTful web service, in various programming languages (e.g., Python, Java, PHP, etc.) The templates allow a SDK client for the RESTful web service to be easily programmed without a user (e.g., software developer) having to have familiarity with HTTP. There can be a template for various programming languages (e.g., Python, Java). The template can abstract the RESTful web service HTTP between a client hosting an application to consume the resources of the RESTful web service and the server hosting the RESTful web service.

Various implementations describe a server computer system identifying metadata components that are associated with one or more uniform resource identifiers (URIs) in a service description language file for a RESTful (Representational State Transfer) web service. Examples of metadata components can include, for example, and not limited to, a URI description component, a HTTP method component, a header parameter component, a body parameter component, a URI argument component, a response component, and a documentation component. The metadata components can include sub-components. For example, a HTTP method component can include sub-components for the specific HTTP method. For example, there may be a HTTP POST method sub-component, a HTTP GET method sub-component, a HTTP DELETE method sub-component, etc.

The server computer system identifies a programming language for a template pertaining to a method of a SDK client. For of the individual metadata components and/or sub-components, The server computer system can identify a programming code format in the identified programming language that corresponds to the metadata component and/or sub-component. The server computer system creates the template and programming code placeholders for the metadata components and/or sub-components in the template based on the identified programming language. For example, a HTTP POST method sub-component may correspond to an 'add' method (function) in the Python programming language, and the server computer system can create a programming code placeholder for an 'add' method (function) in the template.

FIG. 1 is an example system architecture 100 for various implementations. The system architecture 100 can include one or more machines 130 coupled to one or more client machines 103 via a network 120. The network 120 may be a public network, a private network, or a combination thereof. The machines 130 can include, and are not limited to, any data processing device, such as a desktop computer, a laptop computer, a mainframe computer, a personal digital assistant, a server computer, a handheld device or any other device configured to process data.

A machine 130 can include a server 133. The server 133 can include one or more RESTful web services 135. REpresentational State Transfer (REST) is an architecture style for accessing information on the web. In REST, information on the server-side is considered a resource, which developers can access in a uniform way using URIs and HTTP.

A RESTful web service 135 can be defined based on input of an entity. An entity, as referred to herein, can represent any person, a business organization such as a corporation, an educational institution such as a college and university, etc. The RESTful web service 135 can have one or more resources, which can be accessed, for example by an application 107 hosted on a client machine 103 via a RESTful SDK client 105. The client machine 103 may be a computing device such as a server computer, a desktop computer, a set-top box, a gaming console, a television, a portable computing device such as, and not limited to, mobile telephones, personal digital assistants (PDAs), portable media players, netbooks, laptop computers, and the like.

For example, a RESTful web service 135 may be defined for the entity's customer data. The RESTful web service 135 may have a resource that is a list of all of the entity's customers, a resource that is data for a specific customer, a resource for adding a customer to the customer data, etc. The RESTful web service 135 can have URIs 140A-C that correspond to the resources of the RESTful web service 135. For example, URI 140A can be for the list of all of the entity's customers, URI 140B can be for data for a specific customer identifier (ID), and URI 140C can be used to add a customer.

An application 107 can use the URIs 140A-C via a RESTful SDK client 105 to consume the resources. For example, the application 107 can obtain a list of the entity's customers via the RESTful SDK client 105. The client machines 103 can host one or more applications 107. An application 107 can be any type of application including, for example, a web application, a desktop application, a browser application, etc.

The server 133 can include a web service interface development tool 134 for allowing applications 107 to consume resources of a RESTful web server 135 via a RESTful SDK client 105. In one implementation, the web service interface development tool 134 can include a RESTful service description language (RSDL) module 137, a RESTful client abstraction module 138, a SDK client creation module 139, and a preservation module 109. Note that in alternative implementations, the functionality of one or more of the modules may be combined or divided. The RSDL module 137 can describe the URIs (e.g., URIs 140A-C) for the RESTful web services 135 in a generic format. A generic format is a format that can be used by a number of different programming languages. The RSDL module 137 can publish a description of the URIs 140A-C as server-side metadata 160. The server-side metadata 160 can expose the structure of the URIs 140A-C for the RESTful web service 135 and can include metadata 165A-C for the corresponding URIs 140A-C. The server-side metadata 160 can be a RSDL file that describes the URIs 140A-C. The server-side metadata 160 can be an XML-formatted document that includes information about each URI 140A-C for the RESTful web service, including, for example, and not limited to, operations (e.g., add, delete, get, etc.) that can be called on the RESTful web service 135, input parameters that can be passed for the operations, return values from an operation, etc. In one implementation, the RSDL module 137 uses the source code 150A-C for the URIs 140A-C for the RESTful web service 135 to create the server-side metadata 160. The URI source code 150A-C can be stored in the server 133. In another implementation, the RSDL module 137 receives user input to create the server-side metadata 160 for the URIs 140A-C. The server-side metadata 160 can be stored in a data store that is coupled to the server 133.

The RESTful client abstraction module 138 can create programming language templates 170A-B (also referred to as "templates") for various programming languages, such as, and not limited to, Python and Java. For example, programming language template 170A may be for Python and programming language template 170B may be for Java.

The templates 170A-B, 171A-B can be used to convert the server-side HTTP-based web service resources into the structure of the programming language for the RESTful SDK client 105. For example, the SDK client creation module 139, which resides in the server 133, can use the templates 170A-B,171A-B to automatically generate methods 190A-B, which corresponds to the URIs 140A-C, without user interaction, in various programming languages. For example, programming language template 170A may be used to automatically generate Python methods 190A and programming language template 170B may be used to automatically generate Java methods 190B. For example, if the server-side HTTP-based web service resource uses a POST HTTP method, the programming language template 170B for Java can be used to create a Java-based 'add' method for the RESTful SDK client 105.

The SDK client creation module 139 can automatically create SDK clients 180A-B without user interaction for various programming languages (e.g., Python, Java) based on the methods 190A-B. For example, SDK client 180A may be for Python and SDK client 180B may be for Java. Implementations for automatically creating RESTful web service SDK clients without user interaction is described in greater detail below in conjunction with FIGS. 7-10.

The SDK client creation module 139 can also detect changes made to the RESTful web service 135 and can automatically update the SDK clients 180A-B without user interaction to reflect the change(s) in the RESTful web service 135. For example, a resource to delete a customer may be added to the RESTful web service 135. The SDK client creation module 139 can detect the change, for example, from server-side metadata 160 that has been updated for the 'delete' resource, can create new methods 191A-B for the new resource, and can create an updated SDK client 181A-B to reflect the new 'delete' resource offered by the RESTful web service.

A SDK client 180A-B,181A-B, which can include data describing the server-side methods 190A-B,191A-B that can be called, can be downloaded to a client machine 103 as a RESTful SDK client 105. For example, the application 107 may be a Java-based application and the user may use a RESTful SDK client 105 in Java may be installed on the client machine 103 to allow the Java-based application 107 to consume the RESTful web service 135.

Figure 2A:
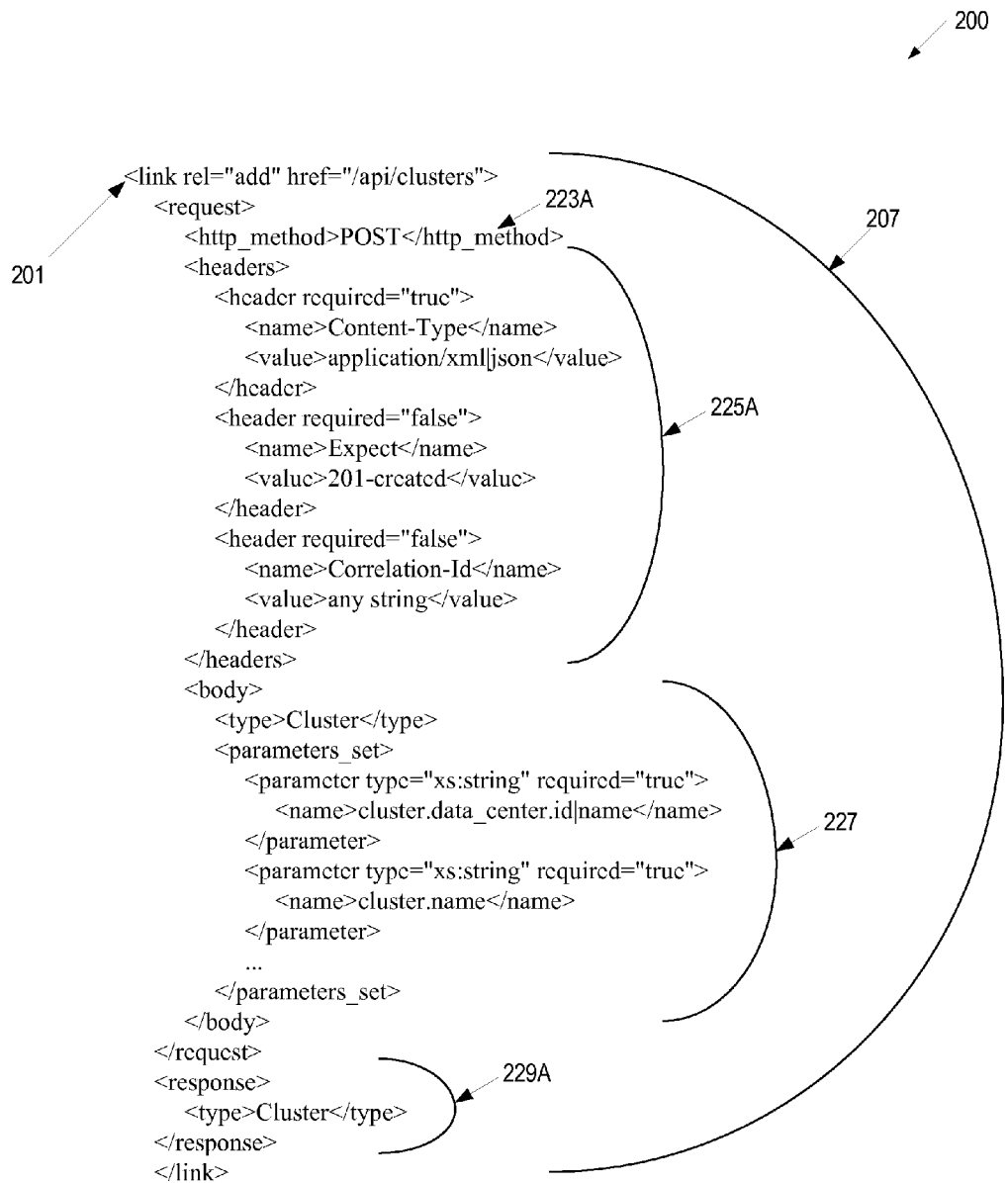
FIGS. 2A-B illustrate an example of server-side metadata describing uniform resource identifiers (URIs) of a RESTful web service, in accordance with various implementations.
Figure 2B:
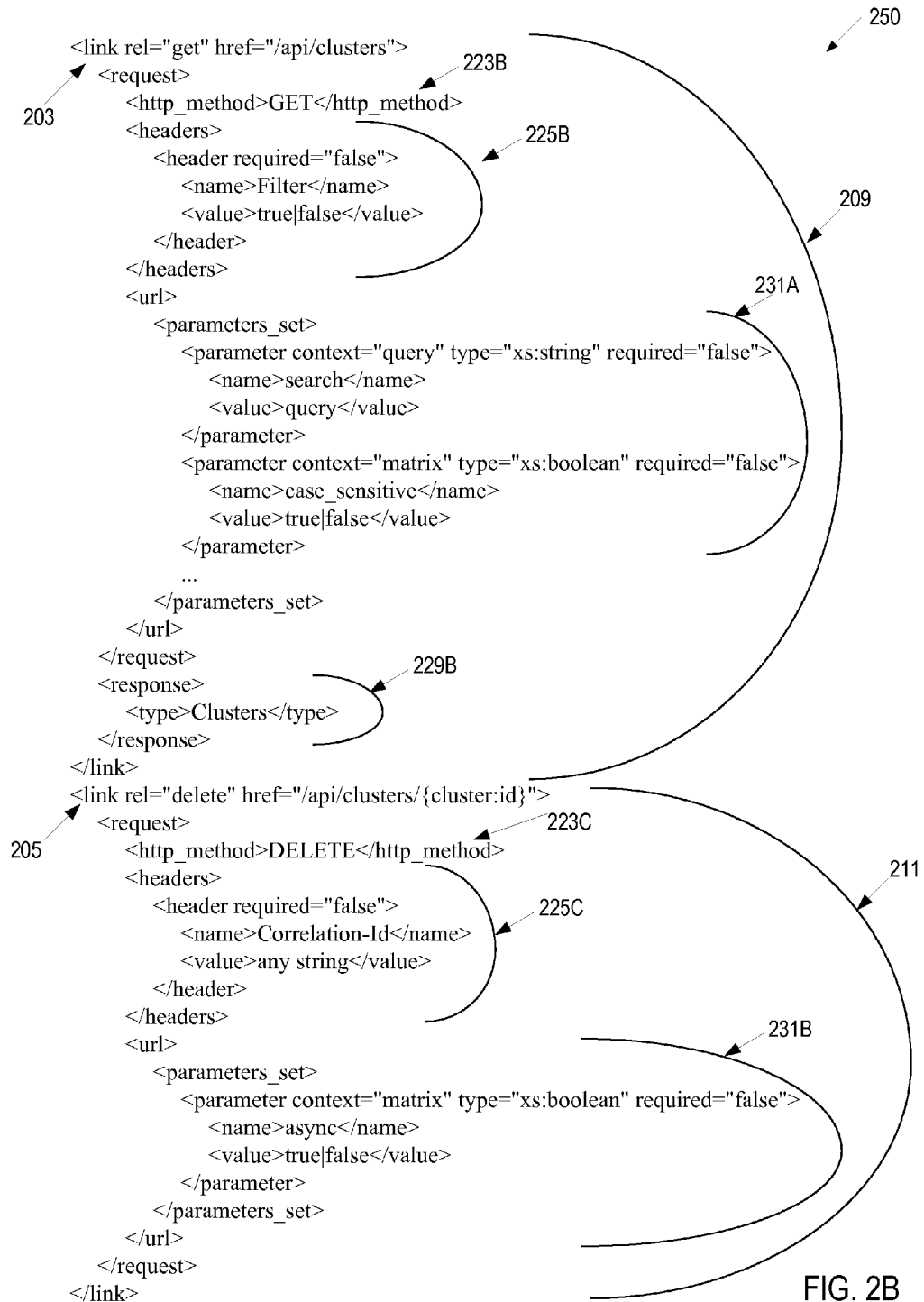

FIGS. 2A-B illustrate an example of a portion of server-side metadata 200,250 describing URIs of a RESTful web service, in accordance with various implementations. The server-side metadata 200,250 can be part of a RSDL file for the RESTful web service. For example, the RESTful web service may be a virtual infrastructure management RESTful web service. The RESTful web service may include URIs for resources, such as, adding a cluster to the infrastructure, providing a list of the clusters in the infrastructure, and deleting a cluster from the infrastructure. The server-side metadata 200,250 can include descriptions for the three URIs. The format of the server-side metadata 200,250 can include a list of URIs and a description for each URI. For example, there is a URI description 201 for the URI in FIG. 2A of the resource that adds a cluster to the infrastructure, a URI description 203 for the URI in FIG. 2B of the resource that provides a list of the clusters in the infrastructure, and a URI description 205 for the URI in FIG. 2B of the resource that deletes a cluster from the infrastructure. The URI description 201 can include metadata 207 in FIG. 2A, the URI description 203 can include metadata 209 in FIG. 2B, and the URI description 205 can include metadata 211 in FIG. 2B. The metadata 207,207,211 can describe one or more operations (e.g., add, delete, get, etc.) that can be called on the RESTful web service, one or more input parameters that can be passed for the operations, return values from an operation, etc.

A RESTful client abstraction module (e.g, RESTful client abstraction module 138 in FIG. 1) can create programming templates (e.g., programming templates 170A-B in FIG. 1) by identifying the metadata components in the server-side metadata 200,250 for the URIs of the RESTful web service. Examples of metadata components can include, and are not limited to, a URI description component 201 in FIG. 2A, URI description components 203,205 in FIG. 2B, a HTTP method component 223A in FIG. 2A, HTTP method components 223B-C in FIG. 2B, a header parameter component 225A in FIG. 2A, header parameter components 225B-C in FIG. 2B, a body parameter component 227 in FIG. 2A, a URI argument component 231A-B in FIG. 2B, a response component 229A in FIG. 2A, a response component 229B in FIG. 2B, and a documentation component.

The SDK client creation module (e.g., SDK client creation module 139 in FIG. 1) can use the programming templates (e.g., programming templates 170A-B in FIG. 1) to automatically create methods, which correspond to the URIs of the RESTful web service resources, without user interaction in various programming languages. For example, the SDK client creation module can use a Python template to create an 'add' method in Python for the URI description 201 in FIG. 2A, a 'get' method in Python for the URI description 203 in FIG. 2B, and a 'remove' method in Python for the URI description 205 in FIG. 2B. The SDK client creation module can create a SDK client for Python that describes the Python methods (e.g., add method, get method, and remove method) that can be called, for example, by an application via the SDK client. Implementations for creating a SDK client is are described in greater detail below in conjunction with FIGS. 7-10.

Figure 3:
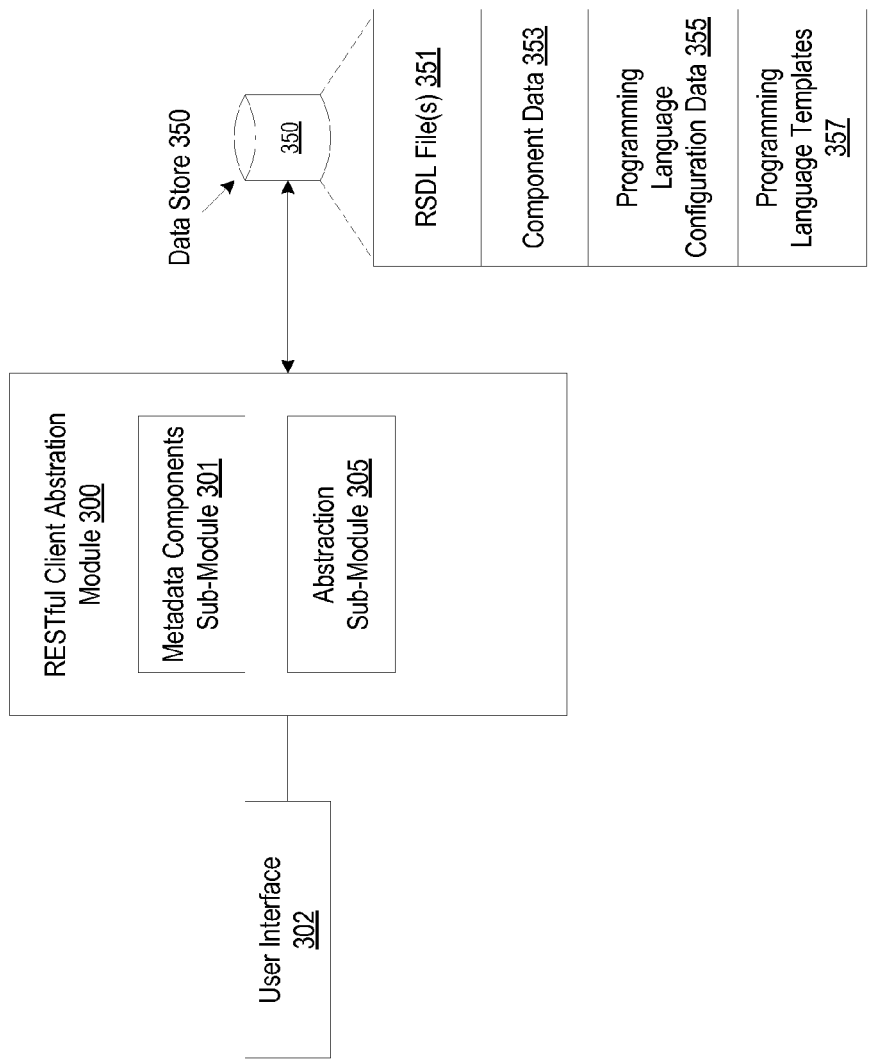
FIG. 3 is a block diagram of an implementation of a RESTful client abstraction module.

FIG. 3 illustrates a block diagram of one implementation of a RESTful client abstraction module 300. The RESTful client abstraction module 300 can automatically create programming language templates 357 (e.g., programming language templates 170A-B in FIG. 1) for various programming languages for abstracting HTTP, or similar protocol (e.g., HTTPS), between a client (e.g., RESTful SDK client 105 in FIG. 1) and a server hosting a RESTful web service. For example, the RESTful client abstraction module 300 can create a Python programming template, a Java programming template, a PHP programming language template, etc.

The RESTful client abstraction module 300 may correspond to a RESTful client abstraction module 138 in a machine 130 of FIG. 1. The RESTful client abstraction module 300 can include a metadata component sub-module 301 and an abstraction sub-module 305. Note that in alternative implementations, the functionality of one or more of the sub-modules can be combined or divided.

The metadata component sub-module 301 can identify the metadata components in a RESTful service description language. Examples of the metadata components can include, and are not limited to, a URI description component, a HTTP method component, a header parameter component, a body parameter component, a URI argument component, a response component, and a documentation component. The metadata components can have sub-components. For example, a HTTP method component can have sub-components to represent the various HTTP methods (e.g., POST, GET, DELETE, etc.).

The metadata component sub-module 301 can be coupled to a data store 350 that stores server-side metadata (e.g., RSDL files 351) for RESTful web services. In one implementation, the metadata component sub-module 301 searches the RSDL files 351 to identify the metadata components and/or sub-components. In another implementation, the data store 350 may store component data 353 that describes the metadata components and/or sub-components and the metadata component sub-module 301 can identify the metadata components and/or sub-components from the component data 353. The component data 353 can be user-defined data. For example, the metadata component sub-module 301 may receive user input from a RESTful web service developer, via user interface 302, specifying the various metadata components and/or sub-components. The user interface 302 can be, for example, and not limited to, a graphical user interface (GUI), command-line interface, etc. In another implementation, the metadata component sub-module 301 automatically creates the component data 353 after searching and extracting the metadata components and sub-components from the RSDL files 351.

The abstraction sub-module 305 can identify various programming code formats in various programming languages (e.g., procedural programming languages, object-oriented programming languages) that correspond to the metadata components and/or sub-components and can create programming language templates 357 using the corresponding programming code formats for the metadata components and/or sub-components. Programming code formats can include formats for, for example, and not limited to, methods (functions), object rules, etc. for a programming language. The data store 350 can store programming language configuration data 355 for various programming languages (e.g., Python, Java, etc.) that describes the programming code formats for the corresponding programming language. For example, in Python, the programming code format for a method (function) may be defined with the word "def" followed by the method name and parentheses. Any input parameters or arguments can be placed within the parentheses. The programming code format of a Python method may include a return statement to indicate the exit of the function and optionally passing back an expression to the caller. One example of programming code format for a Python method according to one implementation is described in greater detail below in conjunction with FIG. 5.

The abstraction sub-module 305 can create a programming language template 357 for a particular programming language. The abstraction sub-module 305 can determine which programming language to use, for example, by receiving user input via the user interface 302. In one implementation, the programming language template 357 is a file that can be populated with input data that may be extracted from a RSDL file 351. The populated template can represent one or more methods that correspond to the one or more URIs of a RESTful web service. One implementation of using a template to create methods is described in greater detail below in conjunction with FIG. 9. In another implementation, the programming language template 357 is a script, which when executed, uses input data (e.g., input data extracted from a RSDL file 351) to create a file containing the one or more methods that correspond to the one or more URIs of the RESTful web service.

The abstraction sub-module 305 can create programming code placeholders in the programming language template 357 for the metadata components and/or sub-components using the programming code format that corresponds to the metadata component and/or sub-component. For example, there may be a programming code placeholder in the programming language template 357 for a URI description component, a HTTP method component, a header parameter component, a body parameter component, a URI argument component, a response component, and a documentation component.

The data store 350 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

Figure 4:
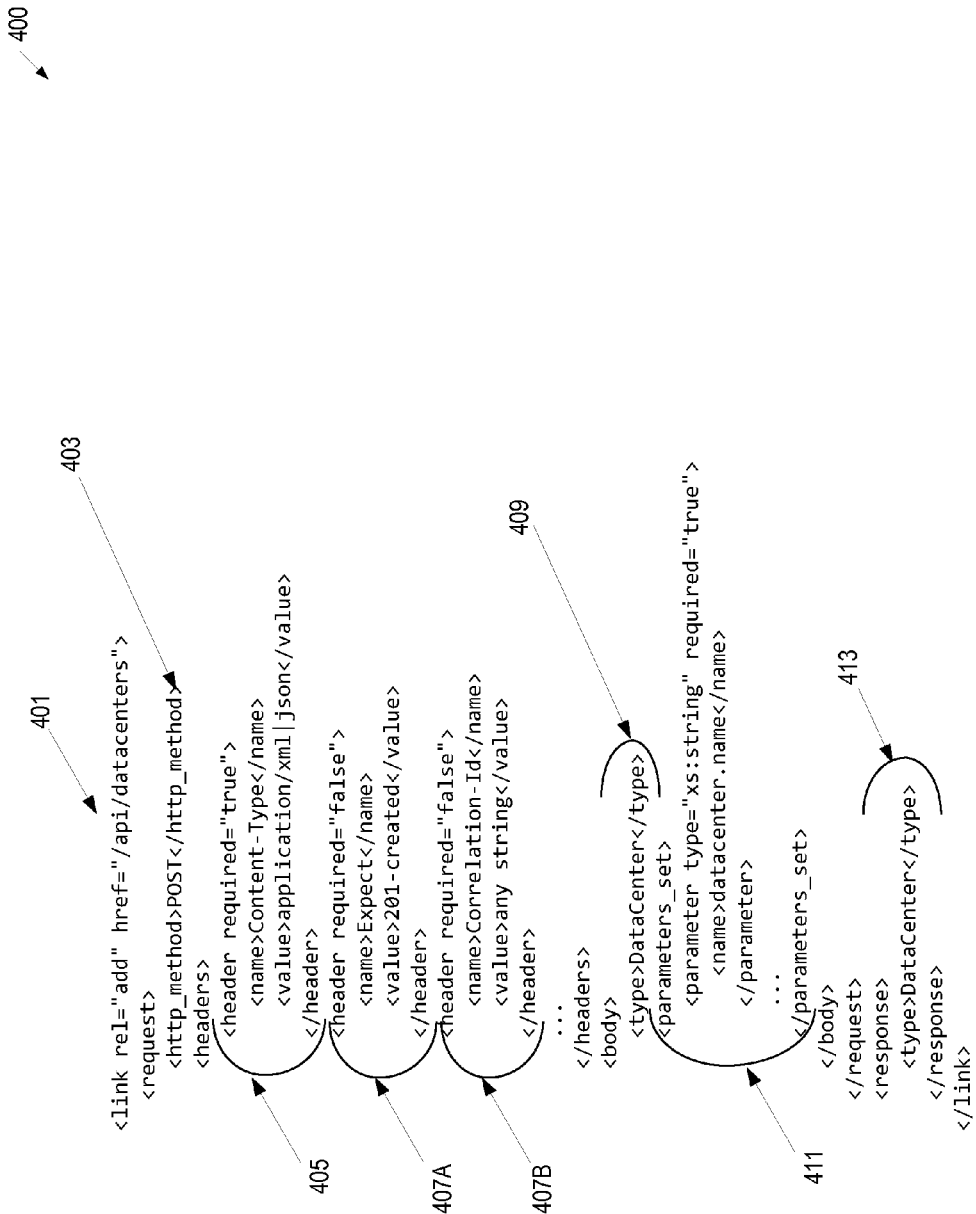
FIG. 4 illustrates an example of server-side metadata describing a URI of a RESTful web service, in accordance with various implementations.

FIG. 4 illustrates an example of a portion of server-side metadata 400 describing a URI of a RESTful web service, in accordance with various implementations. For example, the RESTful web service may be a virtual infrastructure management web service. The RESTful web service may include a resource for adding a data center to the infrastructure. The resource can have a corresponding URI. The server-side metadata 400 can include metadata components, such as, a URI description component 401, a HTTP method component 403, a header parameter component 405, a body parameter component 409, a URI argument component, a response component 413, and a documentation component. Examples of sub-components can include, for example, and not limited to, header run-time sub-components 407A,B, which may be sub-components of the header parameter component 405, and a body run-time sub-component 411, which may be a sub-component of the body parameter component 409. In one implementation, a metadata component may not be identified from an RSDL file, but can be identified from component data that is stored in a data store. For example, a documentation component can be a metadata component that is identified from component data rather than from a RSDL file.

Figure 5:
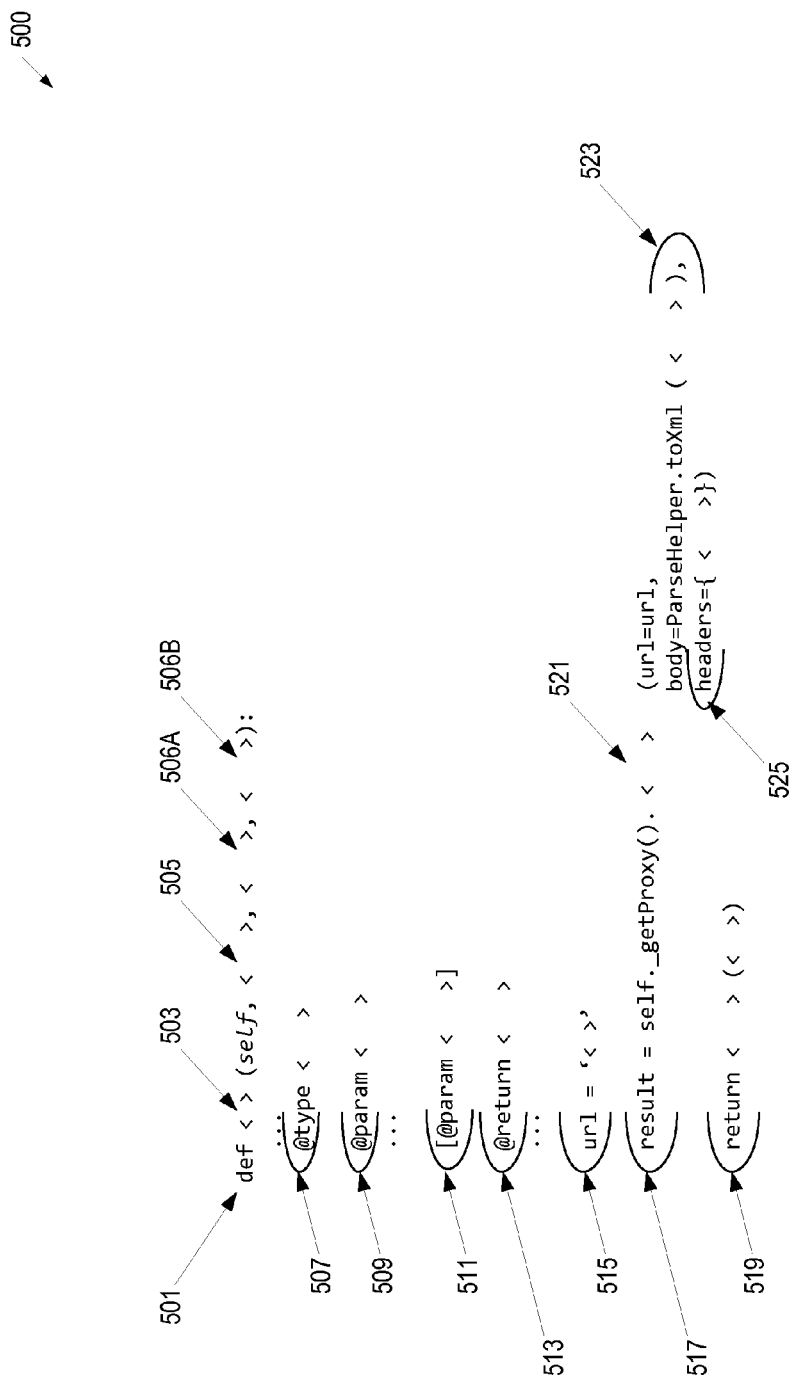
FIG. 5 illustrates an example of a portion of a template containing programming code placeholders, in accordance with various implementations.

FIG. 5 illustrates an example of a portion of a template 500 containing programming code placeholders, in accordance with various implementations. The template 500 can be a file that can be populated with input data that can be extracted from server-side metadata (e.g., RSDL file) for a RESTful web service, according to various implementations. The template 500 can be for a particular programming language. For example, the template 500 may be for the Python programming language.

The template 500 can include programming code placeholders that correspond to metadata components and/or sub-components for a RESTful web service. For example, the template 500 may include a method placeholder that includes various placeholders for various metadata components and/or sub-components. Examples of metadata components can include, and are not limited to, a URI description component, a HTTP method component, a header parameter component, a body parameter component, a URI argument component, a response component, and a documentation component. Examples of sub-components can include, for example, and not limited to, header run-time sub-components, body run-time sub-components, HTTP method sub-components for various HTTP methods (e.g., GET, POST, DELETE, etc.), etc.

For example, for Python, the method placeholder can include the word "def" 501 followed by a method name placeholder 503 that corresponds to a HTTP method component (e.g., HTTP method component 403 in FIG. 4). In one implementation, the programming code placeholders include brackets < > as a representation of input data that may be used to populate the template 500. For example, the URI may use a HTTP POST method as indicated in the RSDL file for the RESTful web service, and the method name placeholder 503 may be populated with "add", which, in Python, may correspond to the POST method. One implementation for populating the template 500 is described in greater detail below in conjunction with FIG. 10.

The method placeholder may include parentheses and the word "self" and one or more parameter placeholders in the parentheses. For Python, any input parameters or arguments can be placed within parentheses. For example, there may be one or more body parameter placeholders 505 that correspond to body parameter components (e.g., body parameter component 409 in FIG. 4) and one or more header parameter placeholders 506A-B that correspond to header parameter run-time sub-components (e.g., header run-time sub-components 407A-B in FIG. 4).

The template 500 can include documentation placeholders 507,509,511,513 that correspond to documentation components. The documentation placeholders can include documentation type placeholder 507 for describing the type of method, documentation parameter placeholders 509,511 for describing the methods, and a documentation return placeholder 513 for describing what the method returns. When populated, the documentation parameter placeholders 509, 511 can include the argument names and one or more lines of descriptive text. When populated, the documentation return placeholder 513 can include the argument names and one or more lines of descriptive text.

The template 500 can include a URI placeholder 515 that corresponds to a URI description component (e.g., a URI description component 401 in FIG. 4). For example, in Python, the URI placeholder 515 may be "url=< >" where the brackets < > represent input data that can be extracted from a RSDL file for a RESTful web service. For example, the URI description component in the server-side metadata (e.g., metadata 400 in FIG. 4) may include href="/api/datacenters," which a portion can be used as input data to populate the URI placeholder 515.

For Python, the template 500 may include a result object placeholder 517 for the method. The result object placeholder 517 can include one or more placeholders that correspond to metadata components and/or sub-components. For example, the result object placeholder 517 can include a method name placeholder 521 that corresponds to the HTTP method component (e.g., HTTP method component 403 in FIG. 4), a body run-time placeholder 523 that corresponds to a body run-time sub-component (e.g., body run-time sub-component 411 in FIG. 4), and a header run-time placeholder 527 that corresponds to a header run-time component (e.g., header run-time sub-component 407A-B in FIG. 4).

For Python, the template 500 may include a return statement for the method to indicate the exit of the function and optionally passing back an expression to the caller. The template 500 can include a return placeholder 519 that corresponds to a response component (e.g., response component 413 in FIG. 4). The return placeholder 519 can include parentheses ( ) to pass back an expression to the caller. The return placeholder 519 can include brackets < > to represent use input data that may be extracted from an RSDL file.

Figure 6:
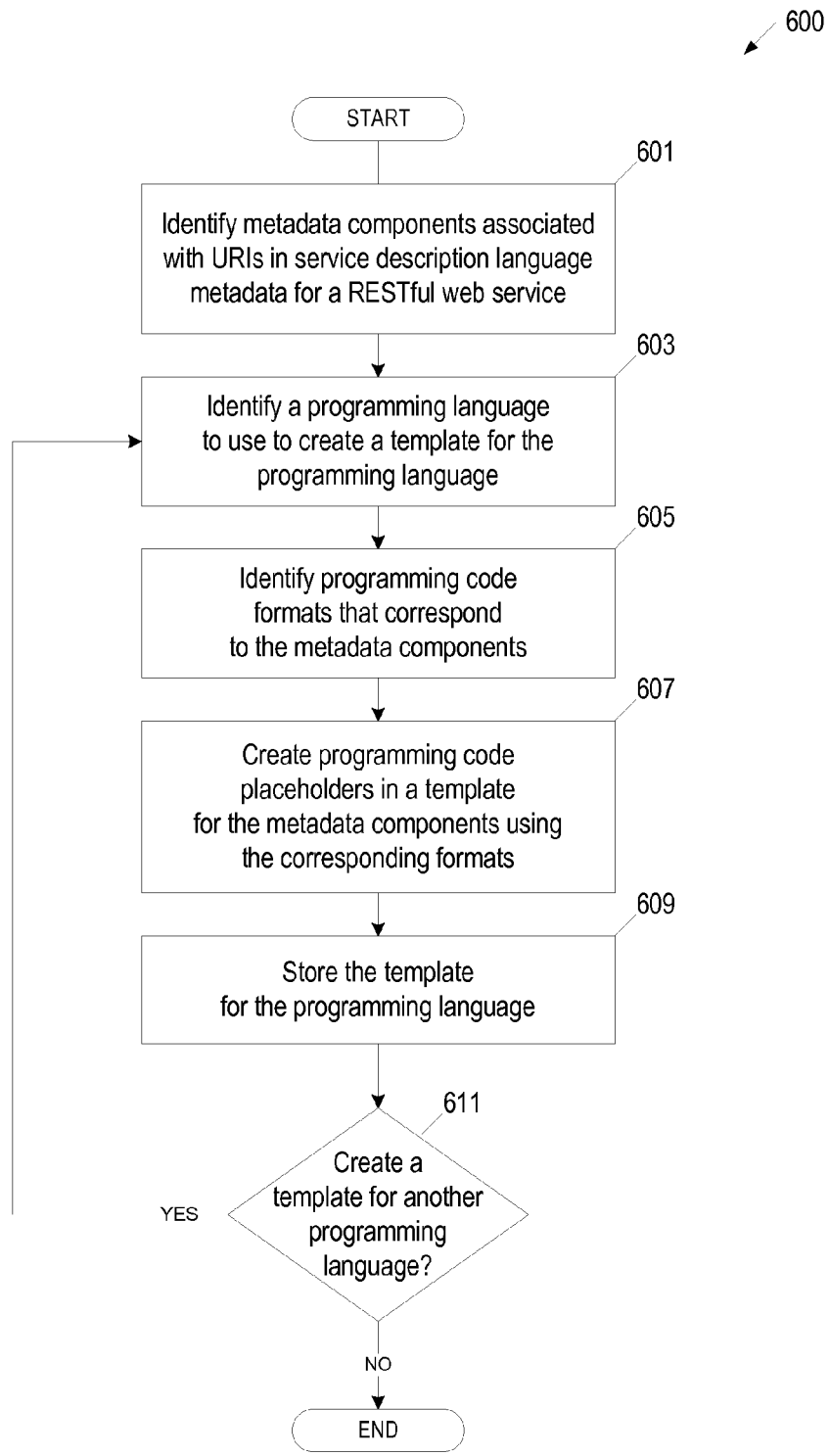
FIG. 6 is a flow diagram of an implementation of a method for creating a programming language template to abstract RESTful web service hypertext transfer protocol between a client and a server.

FIG. 6 is a flow diagram of an implementation of a method 600 for creating a programming language template to abstract RESTful web service HTTP between a client and a server. Method 600 can be performed by processing logic that can comprise hardware (e.g., circuitry, dedicated logic, programmable logic, microcode, etc.), software (e.g., instructions run on a processing device), or a combination thereof. In one implementation, method 600 is performed by a RESTful client abstraction module 138 in a server 133 in a machine 130 of FIG. 1.

At block 601, processing logic identifies metadata components that are associated with one or more URIs in RESTful service description language (e.g., RSDL file) for a RESTful web service. The metadata components can include sub-components. In one implementation, processing logic identifies the metadata components from component data that is stored in a data store that is coupled to the RESTful client abstraction module. In another implementation, processing logic searches RSDL files in the data store to identify the metadata components. At block 603, processing logic identifies a programming language to use to create a template for the programming language. Processing logic can receive user input identifying the which programming language to use. At block 605, processing logic identifies programming code formats that correspond to the metadata components. Processing logic can use programming language configuration data that is stored in the data store to locate the programming code format that corresponds to the metadata components. For example, the programming language configuration data may map a HTTP method component and HTTP POST method sub-component to a programming code format for an 'add' method.

At block 607, processing logic creates programming code placeholders in a template for the metadata components and/or sub-components using the corresponding programming code formats. At block 609, processing logic stores the programming language template in the data store. At block 611, processing logic determines whether to create a programming language template for another programming language. For example, processing logic may receive user input indicating that another programming language template should be created. If there is another programming language template to create, processing logic can return to block 603 to identify the programming language to use to create the programming language template.

Figure 7:
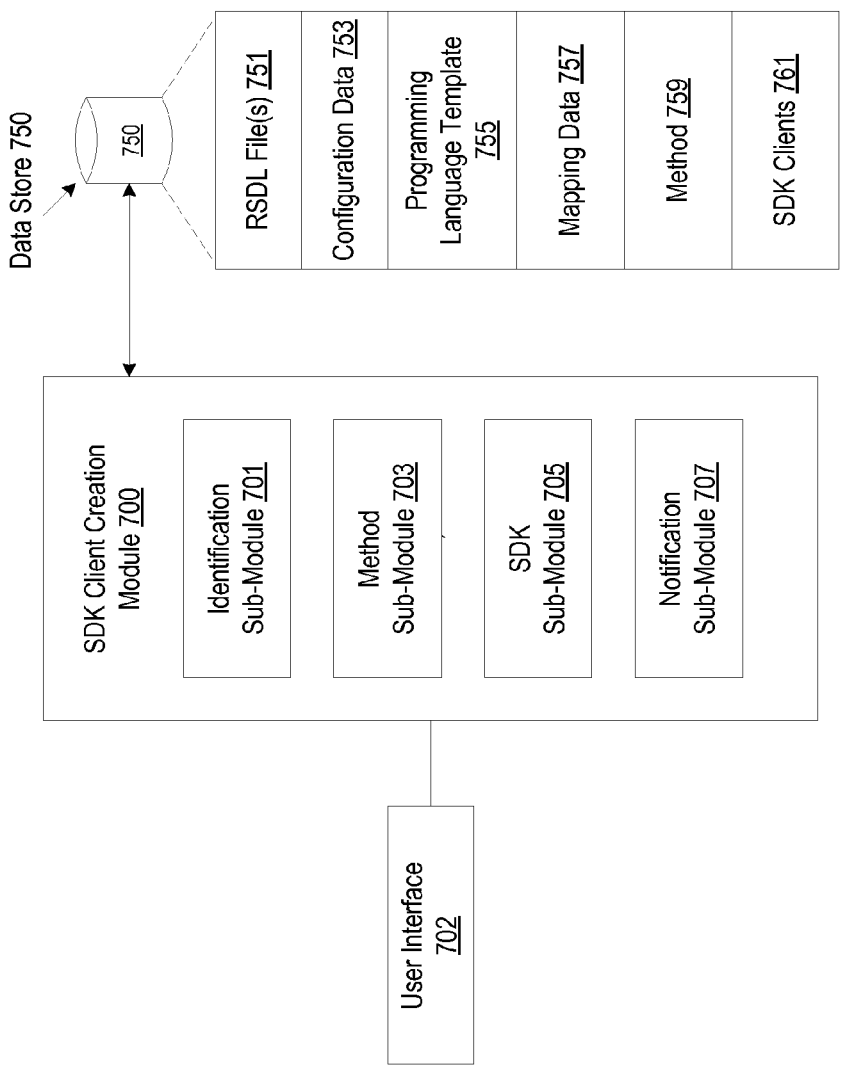
FIG. 7 illustrates a block diagram of one implementation of a software development kit (SDK) client creation module.

FIG. 7 illustrates a block diagram of one implementation of a software development kit (SDK) client creation module 700. The SDK client creation module 700 can automatically create methods without user interaction for various programming languages for the URIs for a RESTful web service. For example, the SDK client creation module 700 may automatically create Python methods and Java methods that correspond to the URIs for the resources offered by the RESTful web service. The SDK client creation module 700 can automatically create RESTful web service SDK clients without user interaction for various programming languages that include the methods created for the various programming languages.

The SDK client creation module 700 may correspond to a SDK client creation module 138 in a machine 130 of FIG. 1. The RESTful SDK client creation module 700 can include an identification sub-module 701, a method sub-module 703, a software development kit (SDK) sub-module 705, and a notification sub-module 707. Note that in alternative implementations, the functionality of one or more of the sub-modules can be combined or divided.

The identification sub-module 701 can identify a RESTful service description language (RSDL) describing URIs for a RESTful web service. The RSDL for the RESTful web service can be a RSDL file 751 that is stored in a data store 750 that is coupled to the SDK client creation module 700. The data store 750 can store a RSDL file 751 for any number of RESTful web services. In one implementation, identification sub-module 701 automatically locates a RSDL file 751 for the RESTful web service without user interaction. For example, the identification sub-module 701 may determine the location of a RSDL file 751 based on configuration data 753 that is stored in the data store 750 that is coupled to the identification sub-module 701. In another implementation, the identification sub-module 701 receives user input, via a user interface 702 that is coupled to the identification sub-module 701, identifying which RSDL file 751 to use. The user interface 701 can be a graphical user interface, a command line interface, etc.

The identification sub-module 701 can also identify one or more changes in the RSDL file 751. For example, the identification sub-module 701 may identify a new resource that was added to the RESTful web service.

The identification sub-module 701 can identify URIs and metadata for the URIs in the RSDL file 751 for the RESTful web service. The identification sub-module 701 can use configuration data 753 that is stored in the data store 750 to determine which search terms to use to identify the URIs and the metadata for the URIs. The identification sub-module 701 can use search terms form the configuration data 753 to identify HTTP attribute metadata, HTTP method metadata, header metadata, body metadata, URI argument metadata, response metadata, etc. for the URIs in the RSDL file 751. The identification sub-module 701 can identify metadata for the URIs from other files in the data store 750. For example, the identification sub-module 701 can identify documentation metadata for the URIs from one or more other files in the data store 750.

The identification sub-module 701 can identify a programming language to use to create a SDK client for the RESTful web service. In one implementation, identification sub-module 701 automatically identifies the programming language based on configuration data 753. In another implementation, the identification sub-module 701 receives user input specifying the programming language (e.g., Python, Java, PHP, etc.) to use via the user interface 702. The identification sub-module 701 can identify a programming language template 755 in the data store 750 that corresponds to the identified programming language. The data store 750 can store a programming language template 755 for any number of programming languages.

The method sub-module 703 can create and/or update methods for the URIs. The method sub-module 703 can extract the identified metadata or a portion of the identified metadata from the RSDL file 751 and/or other files in the data store 750 and can populate a programming language template 755 based on the extracted data to create and/or update a method for a URI. One implementation of populating a template to create and/or update a method is described in greater detail below in conjunction with FIG. 9. The method sub-module 703 can use mapping data 757 that is stored in the data store 750 to determine which metadata to use to populate the programming language template 755. For example, the method sub-module 703 may extract a POST method from the RSDL file 751 and may use the mapping data 757 to determine that a POST method corresponds to an "add" method in Python. The method sub-module 703 can populate the Python programming language template 755 with "add" in the appropriate placeholders in the template 755.

The method sub-module 703 can store the created and/or updated methods 759 for the URIs for the RESTful web service on a server. The method sub-module 703 can store the created and/or updated methods 759 for the URIs as part of the SDK clients 761. The server can be the server that is providing the RESTful web service. The method sub-module 703 can store one or more files for the methods 759 in a data store 750 that is coupled to the server. The server-side methods 759 can be called, for example, by an application via the RESTful web service SDK clients (e.g., RESTful SDK client 105 in FIG. 1) to consume the RESTful web service resource that corresponds to the method 759. The server may receive a call from the SDK client to execute one for the stored methods 759, execute the method 759, and return a value to the SDK client.

The SDK sub-module 705 can create SDK clients 761 for various programming languages based on the corresponding methods 759 for the programming languages. The SDK sub-module 705 can create files and/or locate files, for example, from one or more data stores that are coupled to the SDK client creation module 700, and package the files together to create the client SDK 757 for the programming language. For example, for a Python client SDK, the SDK sub-module 705 can include a file describing the Python methods 759, which an application can call via a SDK client, for the RESTful web service, a file containing sample Python code for interfacing with the RESTful web service, a file containing documentation, etc. in the Python SDK client 761. A user, such as software developer, can use the Python SDK client 761 to communicate with the HTTP-based RESTful web service.

The notification sub-module 707 can send a notification describing the created and/or updated SDK clients 761. The notifications can be sent, for example, to systems and/or users that have downloaded the SDK clients 761. The notification can be, for example, and not limited to, an email message, a system message, an instant message, a mobile device message, etc.

The data store 750 can be a persistent storage unit. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items.

Figure 8:
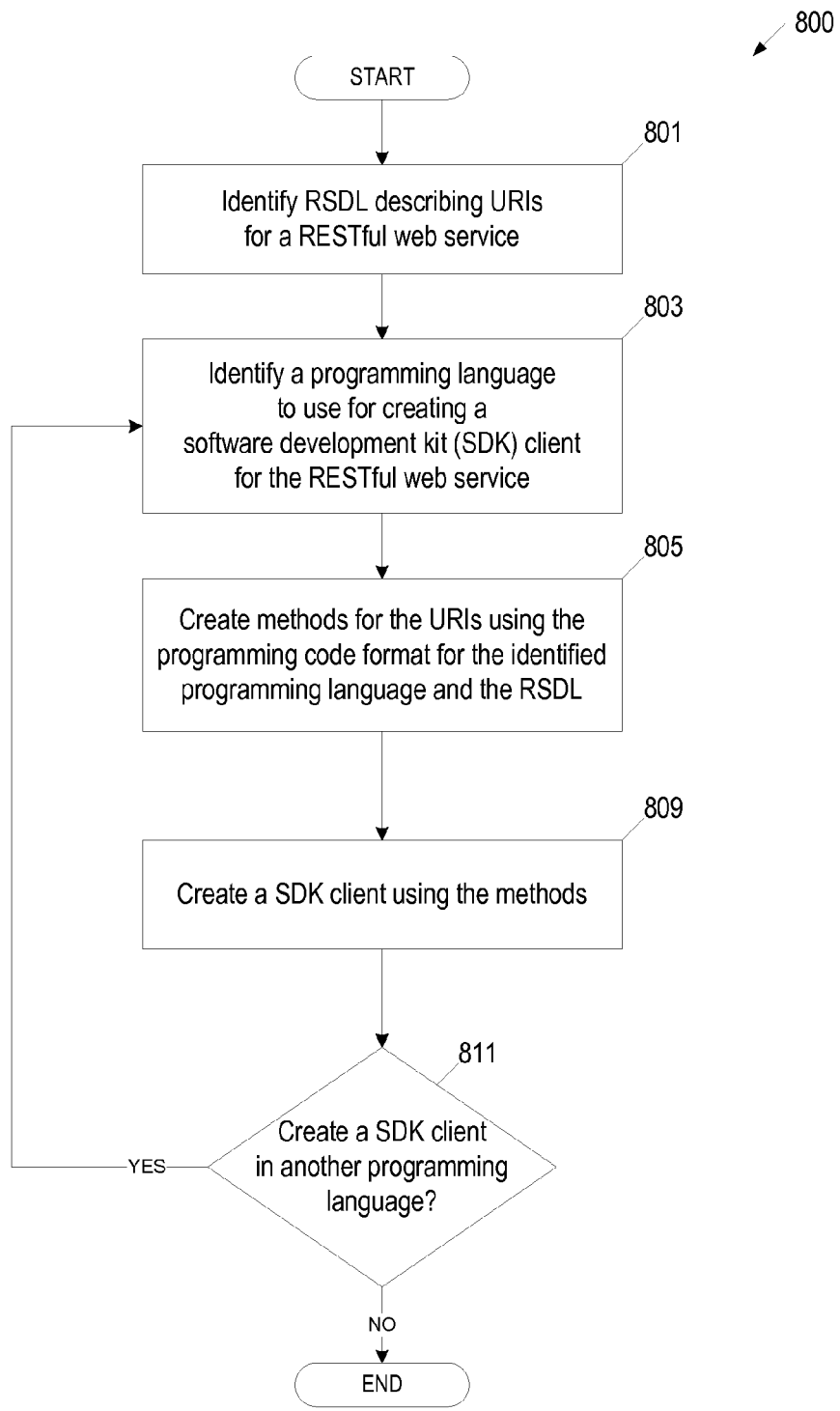
FIG. 8 is a flow diagram of an implementation of a method for automatically generating a RESTful web service software development kit client.

FIG. 8 is a flow diagram of an implementation of a method 800 for automatically generating a RESTful web service software development kit client without user interaction. Method 800 can be performed by processing logic that can comprise hardware (e.g., circuitry, dedicated logic, programmable logic, microcode, etc.), software (e.g., instructions run on a processing device), or a combination thereof. In one implementation, method 800 is performed by a SDK client creation module 139 in a server 133 in a machine 130 of FIG. 1.

At block 801, processing logic identifies URIs for a RESTful web service. Processing logic can identify the URIs in a RESTful service description language (RSDL) describing URIs for a RESTful web service. In one implementation, processing logic automatically locates a RSDL for the RESTful web service without user interaction. For example, processing logic may determine the location of a RSDL file based on configuration data. In another implementation, processing logic receives user input identifying the RSDL for the RESTful web service. For example, processing logic may receive user input of the location of a RSDL file. The RSDL can be stored in a data store that is coupled to the SDK client creation module. At block 803, processing logic identifies a programming language to use for creating a software development kit (SDK) client for the RESTful web service. In one implementation, processing logic automatically identifies the programming language based on configuration data. In another implementation, processing logic receives user input specifying the programming language (e.g., Python, Java, PHP) to use.

At block 805, processing logic creates methods for the URIs for the RESTful web service without user interaction using the programming code format of the identified programming language. Processing logic can also use the RSDL to create the methods. Processing logic can identify a programming language template that corresponds to the identified programming language and can use the programming language template to automatically create the methods. One implementation for using a programming language template to create the methods is described in greater detail below in conjunction with FIG. 9.

At block 809, processing logic automatically creates a SDK client for the identified programming language without user interaction. Processing logic can store the methods as part of the SDK client. Processing logic can create files and/or locate files, and package the files together to automatically create the SDK client for the identified programming language. For example, for a Python SDK client, processing logic can include a file describing the Python methods for the RESTful web service that an application can call via the SDK client, a file containing sample Python code for interfacing with the RESTful web service, a file containing documentation, etc. in the Python SDK client. The SDK client (e.g., Python SDK client) can be used to allow an application (e.g., Python application) to communicate with the HTTP-based RESTful web service.

At block 811, processing logic determines whether to create a SDK client in another programming language. In one implementation, processing logic automatically determines whether to create a SDK client in another programming language based on configuration data. In another implementation, processing logic receives user input indicating whether to create a SDK client in another programming language. If processing logic is to create a SDK client in another programming language, processing logic can return to block 803 to identify the programming language.

Figure 9:
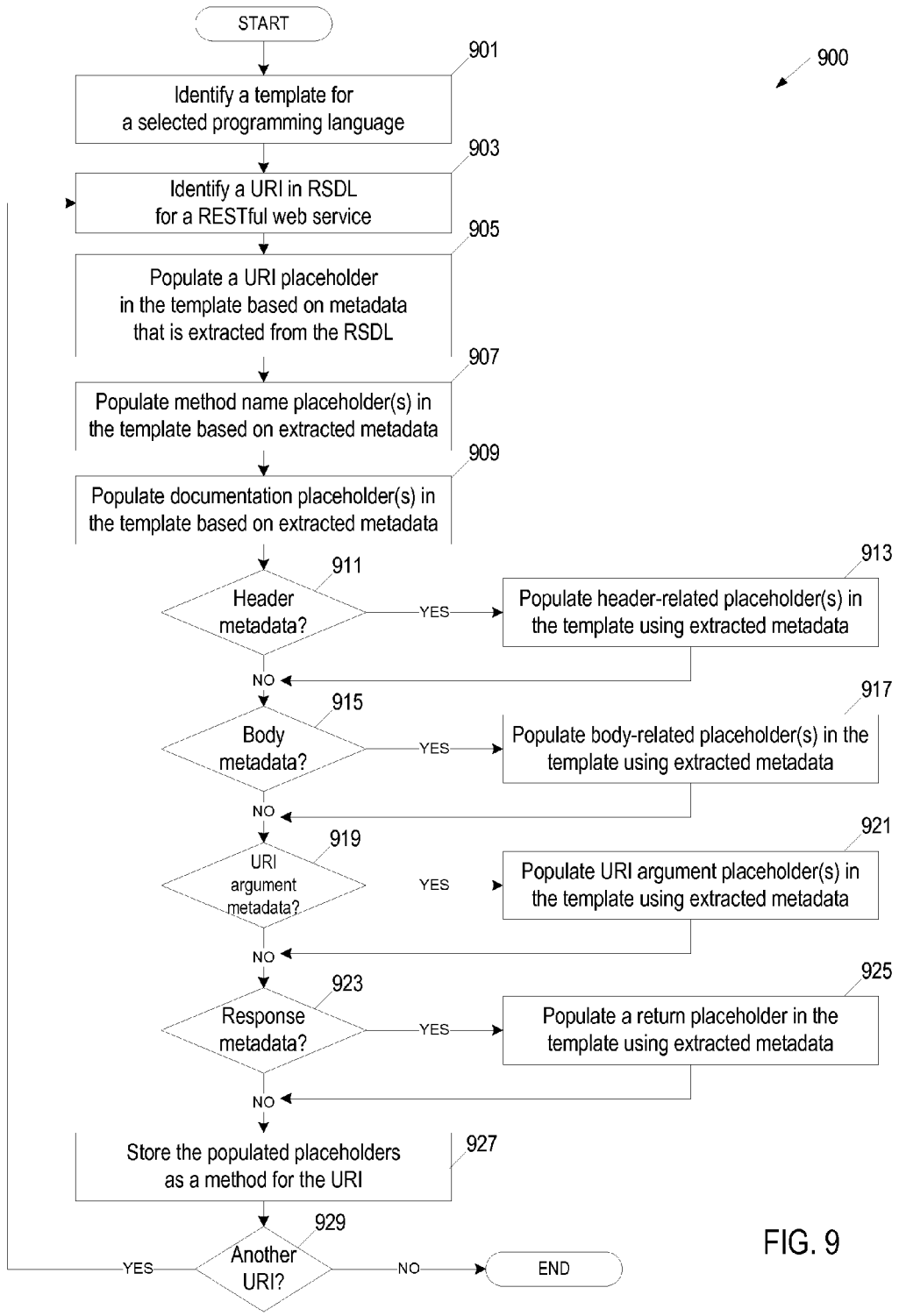
FIG. 9 is a flow diagram of an implementation of a method for automatically creating methods that correspond to URIs for RESTful web service resources.

FIG. 9 is a flow diagram of an implementation of a method 900 for automatically creating methods that correspond to URIs for RESTful web service resources using generic abstraction mechanisms (e.g., templates) to hide the HTTP server nature and without user interaction. Method 900 can be performed by processing logic that can comprise hardware (e.g., circuitry, dedicated logic, programmable logic, microcode, etc.), software (e.g., instructions run on a processing device), or a combination thereof. In one implementation, method 900 is performed by a SDK client creation module 139 in a server 133 in a machine 130 of FIG. 1.

At block 901, processing logic identifies a programming language template in a data store that is coupled to the SDK client creation module for a selected programming language. For example, the selected programming language may be Python, and processing logic may identify a Python programming language template in the data store. At block 903, processing logic identifies a URI in the RESTful service description language (RSDL) (e.g., RSDL file) for a selected RESTful web service. At block 905, processing logic populates a URI placeholder in the template based on metadata that is extracted from the RSDL. For example, processing logic may extract data from a HTTP hypertext attribute (e.g., HTTP href) in the metadata for the URI and may populate the URI placeholder using the extracted HTTP hypertext attribute metadata.

At block 907, processing logic populates a method name placeholder in the template based on metadata that is extracted from the RSDL. For example, processing logic may extract "POST" from the HTTP method metadata for the URI. Processing logic may use mapping data that is stored in the data store to determine that a HTTP POST method corresponds to an "add" method in Python. Processing logic can populate the method name placeholder with "add".

At block 909, processing logic populates documentation placeholders in the template based on metadata that is extracted from the RSDL. For example, processing logic may extract argument names from the metadata for the URI and may populate the documentation placeholders with the argument names.

At block 911, processing logic determines whether there is any header metadata for the URI in the RSDL. Processing logic can use configuration data that is stored in the data to determine which terms to search for in the metadata to determine if there is header metadata. If there is header metadata (block 911), processing logic populates one or more header-related placeholders in the template based on extracted metadata at block 913. One example of a populated header-related placeholder is described in greater detail below in conjunction with FIG. 10, according to one implementation.

At block 915, processing logic determines whether there is any body metadata for the URI in the RSDL. Processing logic can use configuration data that is stored in the data to determine which terms to search for in the metadata to determine if there is body metadata. If there is body metadata (block 915), processing logic populates one or more body-related placeholders in the template based on extracted metadata at block 917. One example of a populated body-related placeholder is described in greater detail below in conjunction with FIG. 10, according to one implementation.

At block 919, processing logic determines whether there is any URI argument metadata for the URI in the RSDL. Processing logic can use configuration data that is stored in the data to determine which terms to search for in the metadata to determine if there is URI argument metadata. If there is URI argument metadata (block 919), processing logic populates one or more URI-argument-related placeholders in the template based on extracted metadata at block 921.

At block 923, processing logic determines whether there is any response metadata for the URI in the RSDL. Processing logic can use configuration data that is stored in the data to determine which terms to search for in the metadata to determine if there is response metadata. If there is response metadata (block 923), processing logic populates a return placeholder in the template based on extracted metadata at block 925. One example of a populated return placeholder is described in greater detail below in conjunction with FIG. 10, according to one implementation.

At block 927, processing logic stores the populated placeholders as a method for the URI. The method for the URI can be stored in a file in a server. The method can be stored as part of the SDK client. At block 929, processing logic determines whether there is another URI in the RSDL for the RESTful web service. If there is another URI, processing logic returns to block 903 to identify the URI in the RSDL.

FIG. 10 illustrates an example of a portion of a template 1000 containing programming code placeholders that are populated with input data to create a method for a URI, in accordance with various implementations. The template 1000 can be a file that can be populated with input data that can be extracted from server-side metadata (e.g., RSDL file) for a RESTful web service and/or other files, according to various implementations. The template 1000 may be for the Python programming language.

For example, the URI may use a HTTP POST method as indicated in the RSDL file for the RESTful web service and the one or more placeholders 1002,1007 may be populated with "add", which, in Python, may correspond to the POST method. The placeholder 1020 may include parentheses and the word "self" and one or more parameter placeholders 1001A-C in the parentheses. For example, there may be one or more body parameter placeholders 1001A that may be populated with data that corresponds to body parameter components (e.g., body parameter component 409 in FIG. 4) and one or more header parameter placeholders 1001B-C that may be populated with data that corresponds to header parameter run-time sub-components (e.g., header run-time sub-components 407A-B in FIG. 4). The documentation placeholders 1003 may be populated with data that corresponds to documentation components. The populated documentation placeholders 1003 may include the argument names and one or more lines of descriptive text. The URI placeholder 1005 may be populated with data that corresponds to a URI description component (e.g., a URI description component 401 in FIG. 4). For example, the URI description component in the server-side metadata (e.g., metadata 400 in FIG. 4) may include href="/api/datacenters" that can be used as input data to populate the URI placeholder 1005. For Python, the result object placeholder 1017 may be populated with data that corresponds to one or more metadata components and/or sub-components. For example, the result object placeholder 1017 may be populated with data 1009 that corresponds to a body run-time sub-component (e.g., body run-time sub-component 411 in FIG. 4), and/or data 1013,1015 that corresponds to a header run-time component (e.g., header run-time sub-component 407A-B in FIG. 4). The return placeholder 1019 may be populated with data 1021 that corresponds to a response component (e.g., response component 413 in FIG. 4).

Figure 11:
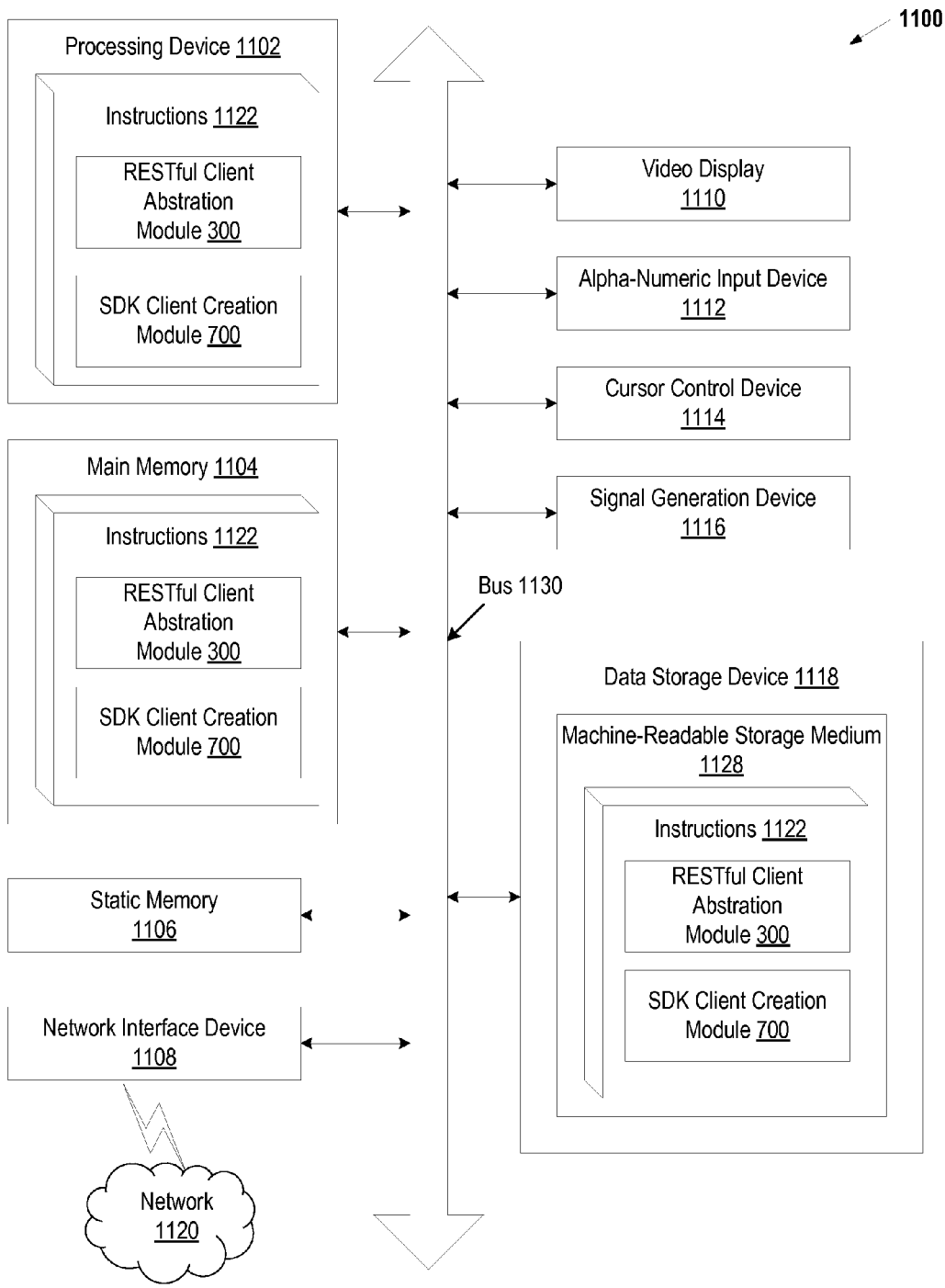
FIG. 11 is a block diagram of an example computer system that may perform one or more of the operations described herein.

FIG. 11 illustrates an example machine of a computer system 1100 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1100 includes a processing device 1102, a main memory 1104 (e.g., read-only memory (ROM), flash memory, dynamic random access memory (DRAM) such as synchronous DRAM (SDRAM) or DRAM (RDRAM), etc.), a static memory 1106 (e.g., flash memory, static random access memory (SRAM), etc.), and a data storage device 1118, which communicate with each other via a bus 1130.

Processing device 1102 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 1102 may also be one or more special-purpose processing devices such as an application specific integrated circuit (ASIC), a field programmable gate array (FPGA), a digital signal processor (DSP), network processor, or the like. The processing device 1102 is configured to execute instructions 1122 for performing the operations and steps discussed herein.

The computer system 1100 may further include a network interface device 1108. The computer system 1100 also may include a video display unit 1110 (e.g., a liquid crystal display (LCD) or a cathode ray tube (CRT)), an alphanumeric input device 1112 (e.g., a keyboard), a cursor control device 1114 (e.g., a mouse), and a signal generation device 1116 (e.g., a speaker).

The data storage device 1118 may include a machine-readable storage medium 1128 (also known as a computer-readable medium) on which is stored one or more sets of instructions or software 1122 embodying any one or more of the methodologies or functions described herein. The instructions 1122 may also reside, completely or at least partially, within the main memory 1104 and/or within the processing device 1102 during execution thereof by the computer system 1100, the main memory 1104 and the processing device 1102 also constituting machine-readable storage media.

In one implementation, the instructions 1122 include instructions for a RESTful client abstraction module (e.g., RESTful client abstraction module 300 of FIG. 3) and/or a software development kit (SDK) client creation module (e.g., SDK client creation module 700 of FIG. 7) and/or a software library containing methods that call modules in a RESTful client abstraction module and/or a SDK client creation module. While the machine-readable storage medium 1128 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "creating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
    identifying a component associated with a uniform resource identifier (URI) in metadata for a RESTful (Representational State Transfer) web service;
    receiving user input selecting a programming language;
    determining programming code format for the component in the selected programming language;
    populating, by a processing device, a file with the programming code format of the component in the selected programming language;
    identifying, in the metadata, a sub-component for the component; and
    creating, by the processing device, a placeholder in the file, the placeholder comprising a sub-component placeholder that corresponds to the sub-component, wherein the file causes creation of a method for the URI of the RESTful web service.

2. The method of claim 1, wherein the component is a method component associated with a URI description component comprising a hypertext transfer protocol (HTTP) hypertext reference attribute specifying a link to operate on a resource corresponding to the URI.

3. The method of claim 1, wherein the component describes a hypertext transfer protocol (HTTP) method for the URI.

4. The method of claim 1, wherein the metadata comprises a header component.

5. The method of claim 1, wherein the metadata comprises a body component.

6. The method of claim 1, wherein the metadata comprises a response component.

7. A non-transitory computer-readable storage medium including instructions that, when executed by a processing device, cause the processing device to:
    identify a component associated with a uniform resource identifier (URI) in metadata for a RESTful (Representational State Transfer) web service;
    receive user input selecting a programming language;
    determine programming code format for the component in the selected programming language;
    populate, by the processing device, a file with the programming code format of the component in the selected programming language;
    identify, in the metadata, a sub-component for the component; and
    create, by the processing device, a placeholder in the file, the placeholder comprising a sub-component placeholder that corresponds to the sub-component, wherein the file causes creation of a method for the URI of the RESTful web service.

8. The non-transitory computer-readable storage medium of claim 7, wherein the component is a method component associated with a URI description component comprising a hypertext transfer protocol (HTTP) hypertext reference attribute specifying a link to operate on a resource corresponding to the URI.

9. The non-transitory computer-readable storage medium of claim 7, wherein the component describes a hypertext transfer protocol (HTTP) method.

10. The non-transitory computer-readable storage medium of claim 7, wherein the metadata comprises a header component.

11. The non-transitory computer-readable storage medium of claim 7, wherein the metadata comprises a body component.

12. The non-transitory computer-readable storage medium of claim 7, wherein the metadata comprises a response component.

13. A system comprising:
a memory; and
a processing device operatively coupled to the memory to:
identify a component associated with a uniform resource identifier (URI) in metadata for a RESTful (Representational State Transfer) web service;
receive user input selecting a programming language;
determine programming code format for the component in the selected programming language;
populate a file with the programming code format of the component in the selected programming language;
identify, in the metadata, a sub-component for the component; and
create a placeholder in the file, the placeholder comprising a sub-component placeholder that corresponds to the sub-component, wherein the file causes creation of a method for the URI of the RESTful web service.

14. The system of claim 13, wherein the component is a method component associated with a URI description component comprising a hypertext transfer protocol (HTTP) hypertext reference attribute specifying a link to operate on a resource corresponding to the URI.

15. The system of claim 13, wherein the component describes a hypertext transfer protocol (HTTP) method.

16. The system of claim 13, wherein the metadata comprises a header component.

17. The system of claim 13, wherein the metadata comprises a body component.

* * * * *